US008596258B1

(12) United States Patent  
Gonzalez et al.

(10) Patent No.: US 8,596,258 B1
(45) Date of Patent: Dec. 3, 2013

(54) COAL-PREPARING DEVICE FOR CHARCOAL BRIQUETTES

(76) Inventors: Mario F. Gonzalez, Tinley Park, IL (US); John Romero, Sr., Palos Hills, IL (US); Dora A. Gonzalez, Tinley Park, IL (US); Leticia Romero, Palos Hills, IL (US)

( * ) Notice: Subject to any disclaimer, the term of this patent is extended or adjusted under 35 U.S.C. 154(b) by 817 days.

(21) Appl. No.: 12/623,226

(22) Filed: Nov. 20, 2009

Related U.S. Application Data

(60) Provisional application No. 61/116,421, filed on Nov. 20, 2008.

(51) Int. Cl.
*F23Q 7/02* (2006.01)
*A47J 37/07* (2006.01)

(52) U.S. Cl.
CPC . *A47J 37/079* (2013.01); *F23Q 7/02* (2013.01)
USPC ....................... 126/25 B; 126/25 R

(58) Field of Classification Search
USPC ................... 454/338; 126/25 B, 25 R
See application file for complete search history.

(56) References Cited

U.S. PATENT DOCUMENTS

| | | | | |
|---|---|---|---|---|
| 3,060,868 A | * | 10/1962 | MacLachlan | 126/25 B |
| 3,159,119 A | * | 12/1964 | Hottenroth et al. | 126/25 B |
| 3,191,556 A | * | 6/1965 | Hottenroth et al. | 126/25 B |
| 3,209,712 A | * | 10/1965 | Arena | 126/25 B |
| 3,647,323 A | | 3/1972 | Thomas | |
| 3,697,198 A | | 10/1972 | Holder, Jr. | |
| 3,865,052 A | | 2/1975 | Streets et al. | |
| 3,868,943 A | * | 3/1975 | Hottenroth et al. | 126/25 R |
| 3,889,653 A | | 6/1975 | Scogin | |
| 3,930,490 A | | 1/1976 | Lassy et al. | |
| 3,982,522 A | * | 9/1976 | Hottenroth et al. | 126/2 |
| 4,074,681 A | | 2/1978 | Whiteley | |
| 4,078,542 A | | 3/1978 | Young et al. | |
| 4,089,278 A | | 5/1978 | Brandt | |
| 4,213,443 A | | 7/1980 | Morande, Jr. | |
| 4,217,877 A | | 8/1980 | Uhlyarik | |
| 4,227,510 A | * | 10/1980 | Frazier et al. | 126/25 B |
| 4,261,323 A | | 4/1981 | Horwinski | |
| 4,263,885 A | | 4/1981 | Gillis et al. | |
| 4,295,034 A | * | 10/1981 | Assmann | 219/400 |
| 4,328,784 A | | 5/1982 | Cox | |
| 4,346,302 A | | 8/1982 | Bozzuto | |
| 4,383,517 A | | 5/1983 | Gillis et al. | |
| 4,399,804 A | | 8/1983 | Morande, Jr. | |
| 4,515,147 A | | 5/1985 | Van Grouw et al. | |
| 4,516,561 A | | 5/1985 | Stawski et al. | |
| 4,537,140 A | | 8/1985 | Baker | |

(Continued)

*Primary Examiner* — Steven B McAllister
*Assistant Examiner* — Frances H Kamps

(57) ABSTRACT

A coal-preparing device for charcoal briquettes having a base having an inner cavity, wherein a plurality of pores is disposed in a first position on the base; a canister having an inner cavity for holding charcoal briquettes, the canister is attachable to the first position on the base, wherein a plurality of air holes is disposed in a bottom surface of the canister; and a fan component disposed in the base, the fan component functions to draw air into the inner cavity in the base and through the pores and the air holes into the inner cavity of the canister, the fan component is operatively connected to a power source; wherein in some embodiments, the base is constructed in an L-shape, the L-shape having a horizontal portion and a vertical portion, wherein the fan component is disposed on the vertical portion and the canister is attachable to the horizontal portion.

9 Claims, 8 Drawing Sheets

(56) References Cited

U.S. PATENT DOCUMENTS

| | | | |
|---|---|---|---|
| 4,604,986 A * | 8/1986 | Barnes | 126/25 B |
| 4,813,397 A | 3/1989 | Yamada | |
| 4,902,316 A | 2/1990 | Giles, Sr. et al. | |
| 5,201,860 A | 4/1993 | Richardson | |
| 5,779,769 A | 7/1998 | Jiang | |
| 5,996,572 A | 12/1999 | Hagan | |
| 6,009,867 A * | 1/2000 | Walton | 126/25 B |
| 6,036,736 A | 3/2000 | Wallace et al. | |
| 6,051,802 A | 4/2000 | Davis et al. | |
| 6,347,757 B1 | 2/2002 | Takahashi et al. | |
| 6,571,788 B1 | 6/2003 | Goldstein | |
| 6,707,668 B2 | 3/2004 | Huang | |
| 6,810,792 B1 | 11/2004 | Knight | |
| 6,894,896 B2 | 5/2005 | Lin | |
| D522,002 S | 5/2006 | Cheng | |
| 7,301,765 B2 | 11/2007 | Huang | |
| 7,305,982 B2 | 12/2007 | Gross | |
| 2002/0033100 A1 | 3/2002 | Sada et al. | |
| 2003/0015188 A1 | 1/2003 | Harbin | |
| 2006/0236995 A1 | 10/2006 | Chang | |
| 2007/0044784 A1 * | 3/2007 | Thompson | 126/25 B |
| 2007/0119444 A1 | 5/2007 | Yoon et al. | |
| 2008/0230044 A1 * | 9/2008 | Warner | 126/25 B |

\* cited by examiner

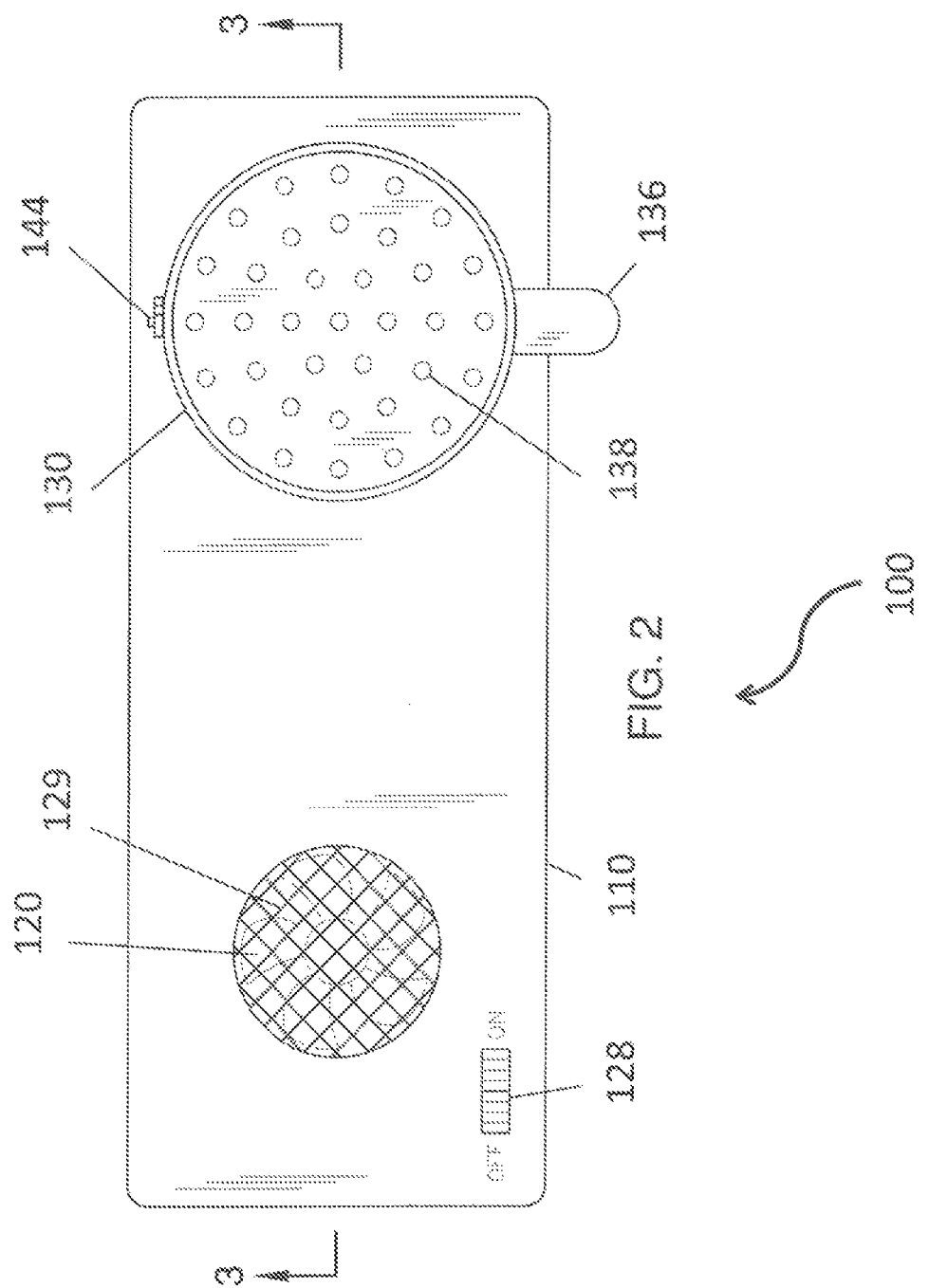

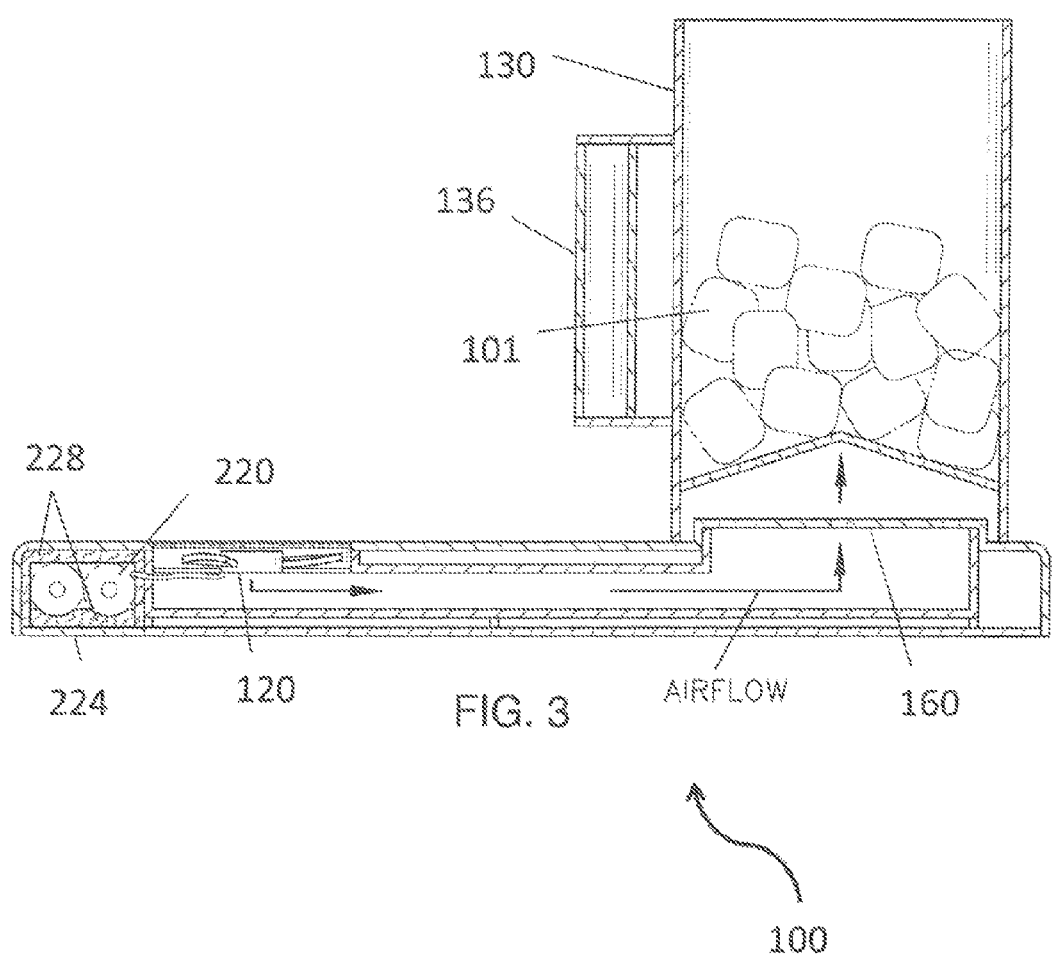

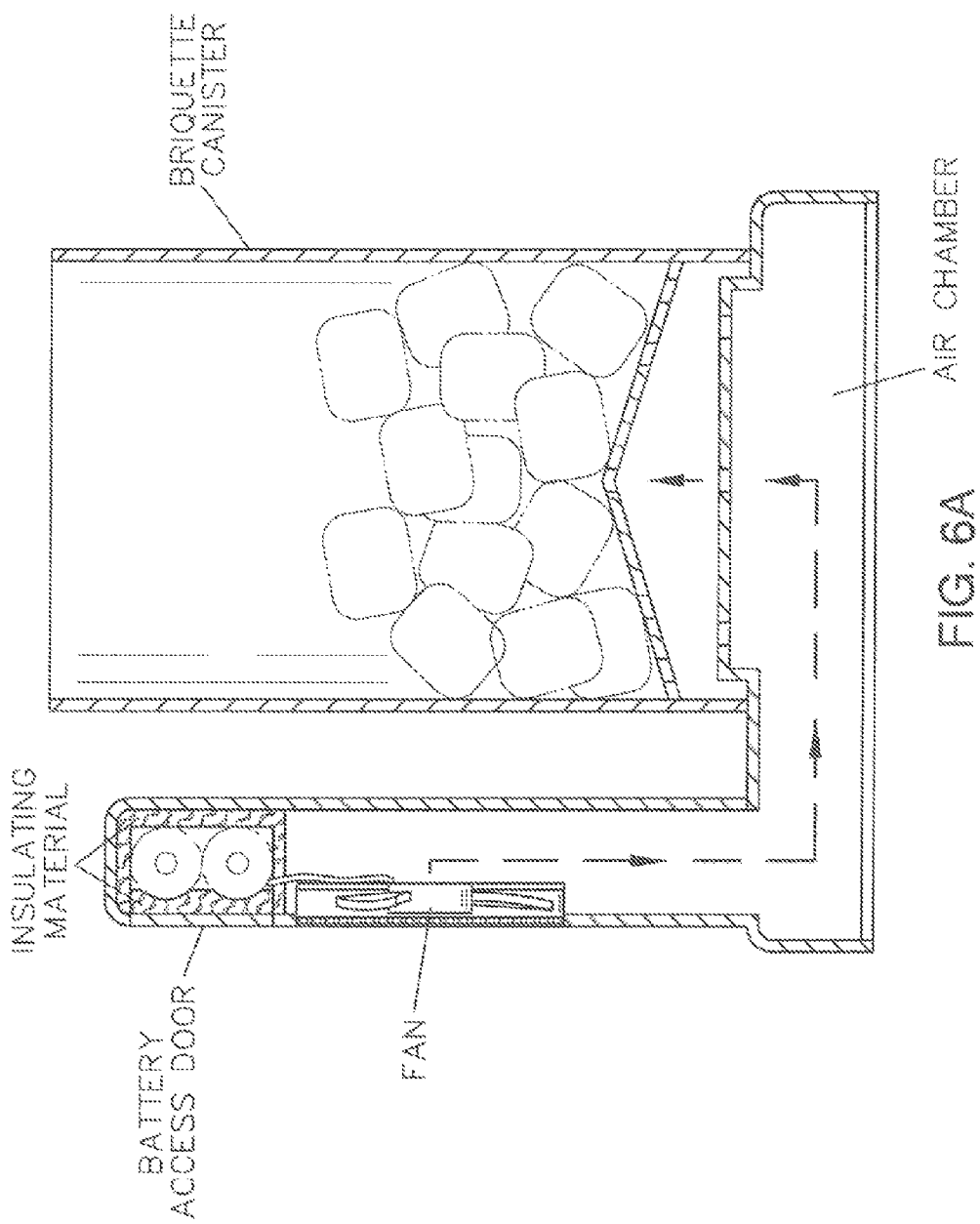

COAL-PREPARING DEVICE FOR CHARCOAL BRIQUETTES

CROSS REFERENCE

This application claims priority to U.S. provisional application Ser. No. 61/116,421 filed Nov. 20, 2008, the specification of which is incorporated herein by reference in their entirety.

FIELD OF THE INVENTION

The present invention is directed to a device for lighting and burning charcoal, more particularly to a portable device that utilizes a fan to circulate air under burning charcoal.

BACKGROUND OF THE INVENTION

Preparing coals from charcoal briquettes can be tedious and it can also be very time consuming. The present invention features a coal-preparing device for charcoal briquettes. The device helps prepare coals from charcoal briquettes in an easy and efficient manner. The device of the present invention is portable, and in some embodiments, the device uses a battery operated fan to circulate air.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 2 is a top view of the coal-preparing device of FIG. 1.

FIGS. 3 and 3A are cross sectional views of the coal-preparing device of FIG. 2.

FIGS. 6 and 6A are cross sectional views of the coal-preparing device of FIG. 5.

DESCRIPTION OF PREFERRED EMBODIMENTS

Referring now to FIG. 1-6, the present invention features a coal-preparing device 100 for burning charcoal briquettes 101. The coal-preparing device 100 can help facilitate the burning of the charcoal briquettes 101, which causes the charcoal briquettes 101 to become coals. The coal-preparing device 100 of the present invention is portable.

Figure 1:
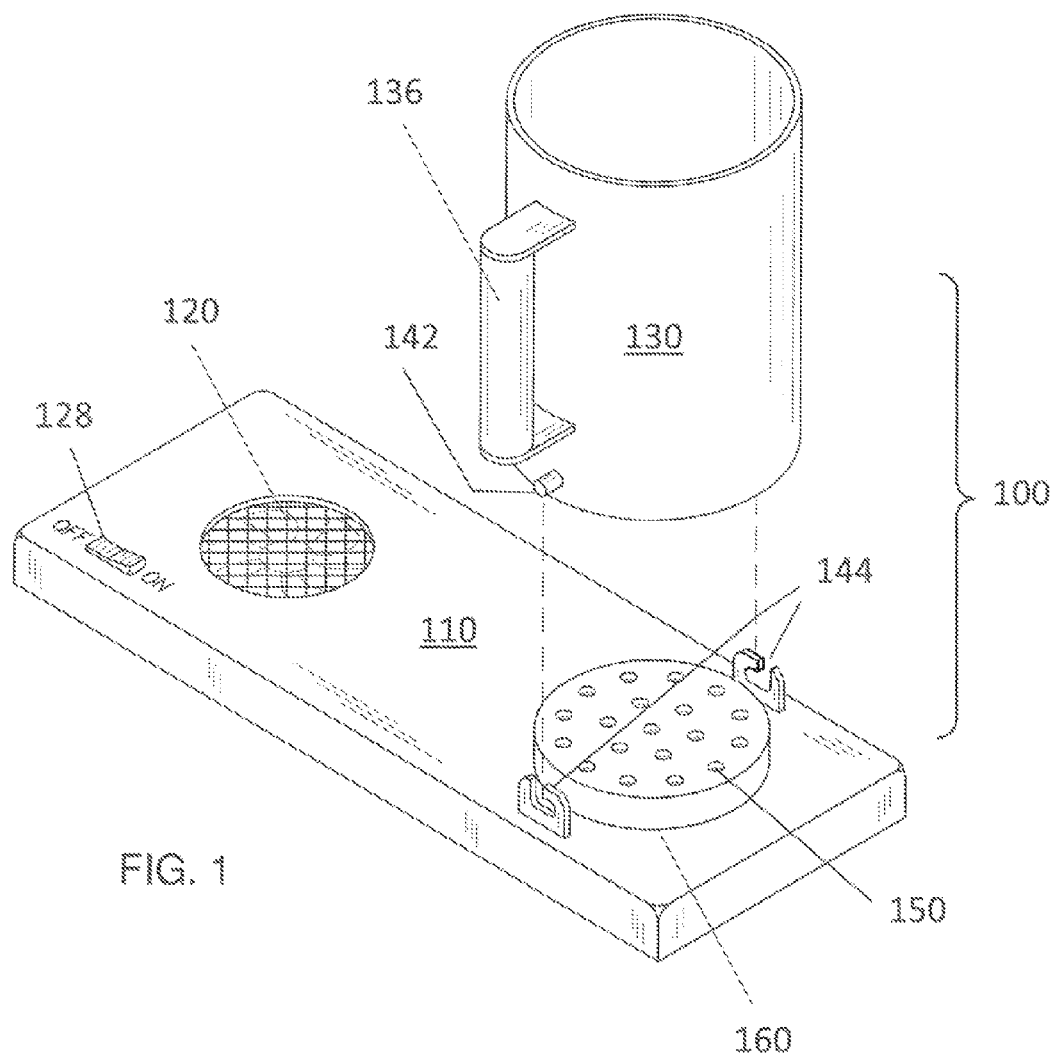
FIG. 1 is a perspective view of the coal-preparing device of the present invention.

Referring now to FIG. 1 and FIG. 2, the coal-preparing device 100 comprises a base 110. The base 110 has a top surface and an inner cavity. The base 110 may be constructed in a variety of shapes. For example, in some embodiments, the base 110 is generally flat (and elongated). In some embodiments, the base 110 has a L-shaped configuration. The present invention is not limited to the aforementioned examples.

Disposed on the top surface of the base 110, for example at or near a first side, is a fan component 120. Fan components are well known to one of ordinary skill in the art. For example, the fan component comprises a plurality of blades attached to an axle and a motor for driving the rotation of the axle. The fan component 120 of the present invention draws air into the inner cavity of the base 110 from outside the base 110. The fan component 120 is operatively connected to a control switch 128, which can move between a first position to turn the fan component 120 on and a second position to turn the fan component 120 off. The fan component 120 is operatively connected to power source (e.g., a battery). In some embodiments, the fan component 120 is covered via a grate 129 disposed in the top surface of the base 110 (see FIG. 2).

Disposed on the base 110 is a canister 130. The canister 130 is attachable to a first position on the base 110, for example on the top surface of the base 110, at or near a second side. The canister 130 has a bottom surface, an open top, and an inner cavity. In some embodiments, a handle 136 is disposed on the canister 130 (e.g., on the outside surface), which provides a user an easy means to lift and carry the canister 130. A plurality of air holes 138 is disposed in the bottom surface of the canister 130 (see FIG. 2).

The canister 130 may be removably or fixedly attached to the base 110. As shown in FIG. 1, the canister 130 is removably attached to the base 110 and the canister 130 can be temporarily secured to the base 110 via a securing means. In some embodiments, the securing means includes a pin and hook system. For example, locking pins 142 may be disposed on the canister 130 (e.g., near the bottom surface of the canister 130) that are configured to engage locking hooks 144 disposed on the base 110. The securing means is not limited to the aforementioned examples, for example the securing means may include a snap mechanism, a clamp mechanism, an adhesive mechanism, a hinge mechanism, the like, or a combination thereof.

In some embodiments, one or more pores 150 are disposed in the base 110 (e.g., in the top surface of the base 110). For example, as shown in FIG. 1, a plurality of pores 150 is disposed in the base 110, the pores 150 being located where the canister 130 is removably attached to the base 110 (e.g., in the first position). Air blown into the inner cavity of the base 110 via the fan component 120 can be blown out of the base 110 via the pores 150. If the base 110 is atop the pores 150, air from the pores 150 is directed into the inner cavity of the canister 130 via the air holes 138 in the canister 130. In some embodiments, an optional platform 160 with pores 150 is disposed on the top surface of the base 110 (e.g., the first position on the base 110). The platform 160 can engage the bottom surface of the canister 130. In some embodiments, a recess is disposed in the bottom surface of the canister 130, which is adapted to receive the platform 160. The platform 160 and recess together may help provide a strong connection between the base 110 and the canister 130, for example they may help provide an air-tight seal between the base 110 and canister 130.

Figure 3A:
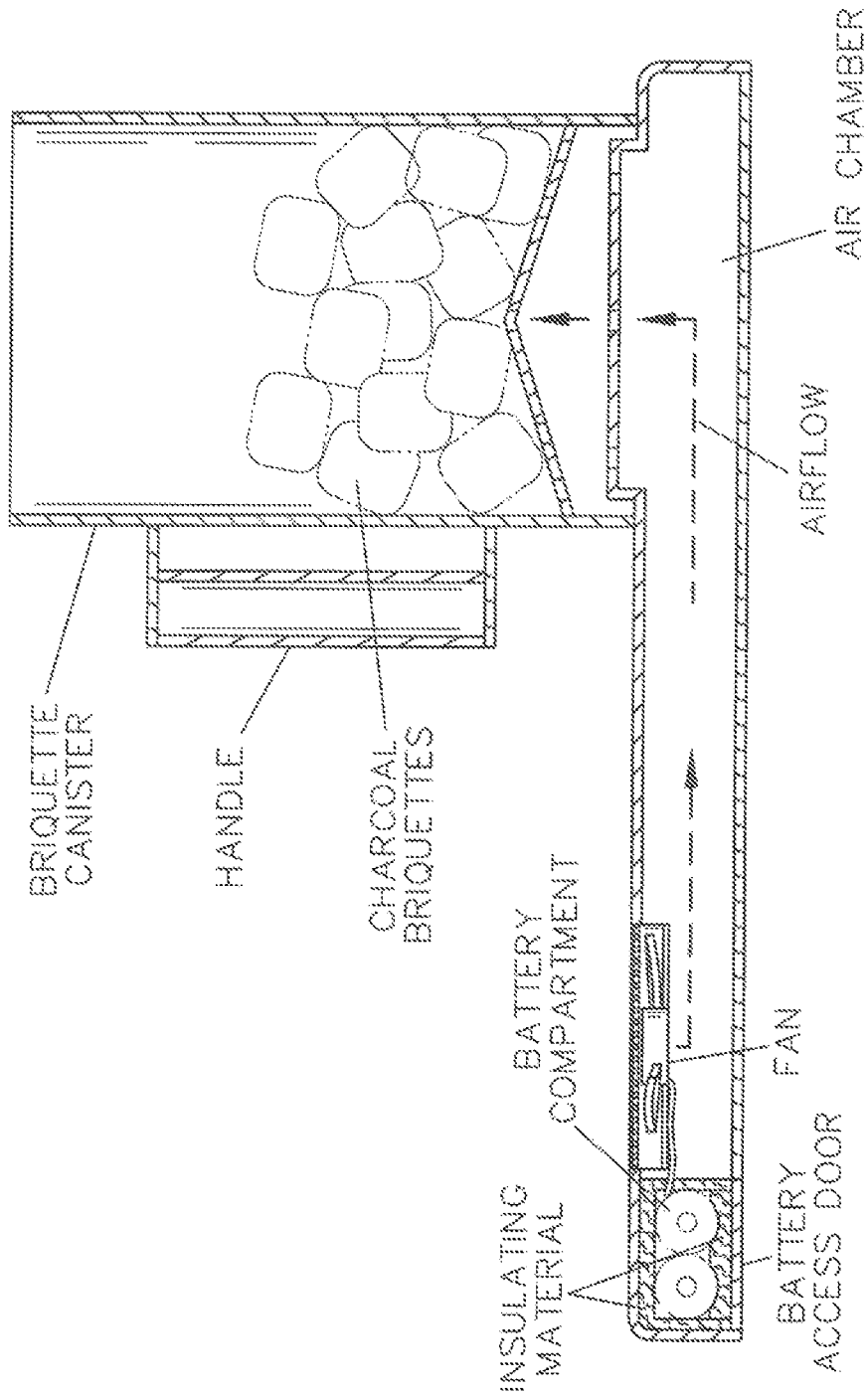
Figure 4:
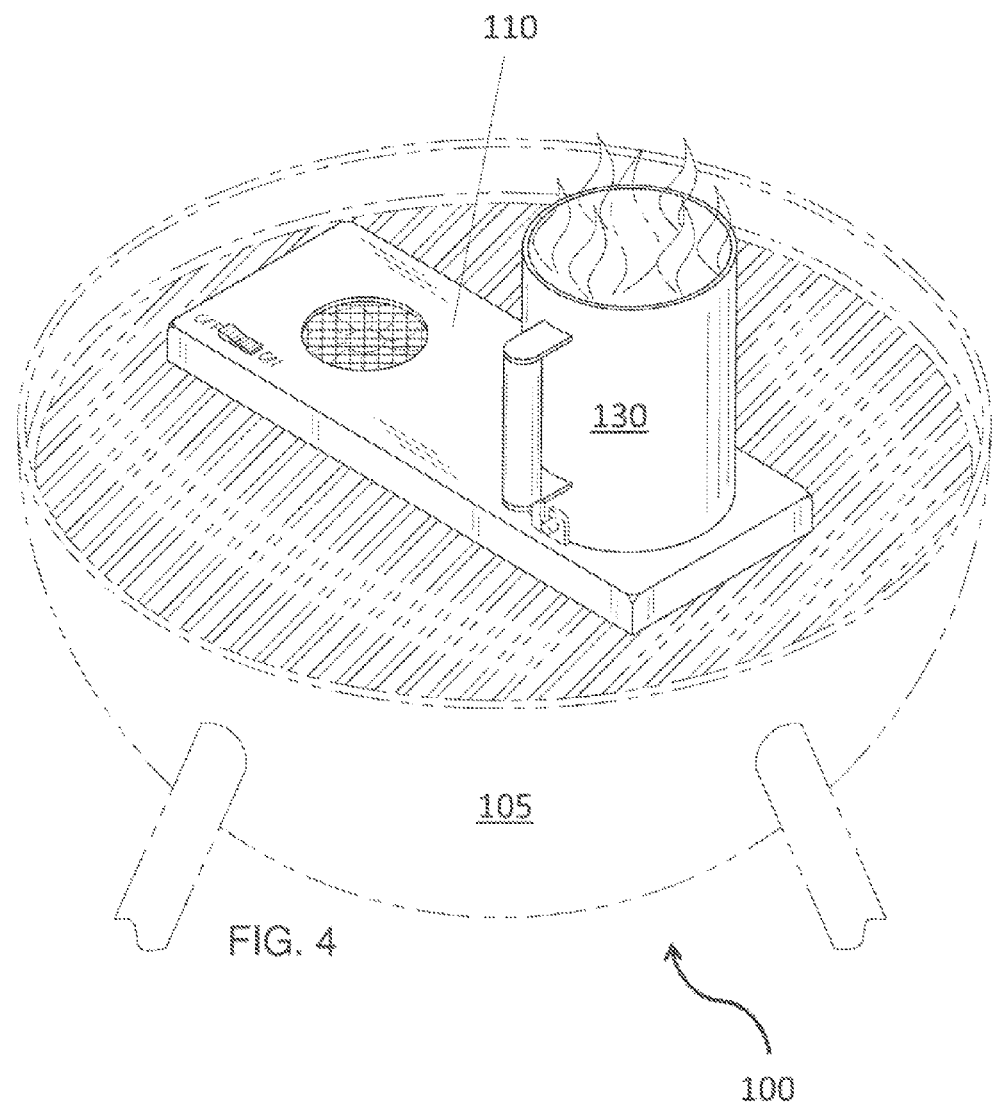
FIG. 4 is a perspective view of the coal-preparing device of FIG. 1 in use.

Referring now to FIG. 3 and FIG. 4, charcoal briquettes 101 can be inserted into the inner cavity of the canister 130. Air drawn into the inner cavity of the base 110 via the fan component 120 is directed through the pores 150 in the base 110 and further through into the inner cavity of the canister 130 via the air holes 138 in the canister 130. When the charcoal briquettes 101 are lit (e.g., and soaked with a lighter fluid or cooking oil), the air from the base 110 can help the charcoal briquettes 101 burn more effectively. When the charcoal briquettes 101 have burned long enough to become coals, they can be removed (e.g., the canister 130 can be removed from the base 110) and placed into a grill 105.

In some embodiments, the bottom surface of the canister 130 is generally flat. As shown in FIG. 3, in some embodiments, the bottom surface of the canister 130 is not generally flat but is slanted or curved (e.g., curved inwardly). The curved or slanted bottom surface of the canister 130 may help increase efficiency of burning of the briquettes 101, for example by increasing the surface area of briquettes 110 that can be contacted by the flowing air.

A battery compartment 220 for holding a battery may be disposed in the base 110, for example in the inner cavity of the base 110 (e.g., near the fan component 120). In some embodiments, the battery compartment 220 comprises an access door 224, which can move between an open and closed position respectively allowing and preventing access to the battery compartment 220 (e.g., for changing batteries). In some embodiments, the battery compartment 220 is insulated with insulation material 228 (e.g., for safety of the battery).

Figure 5:
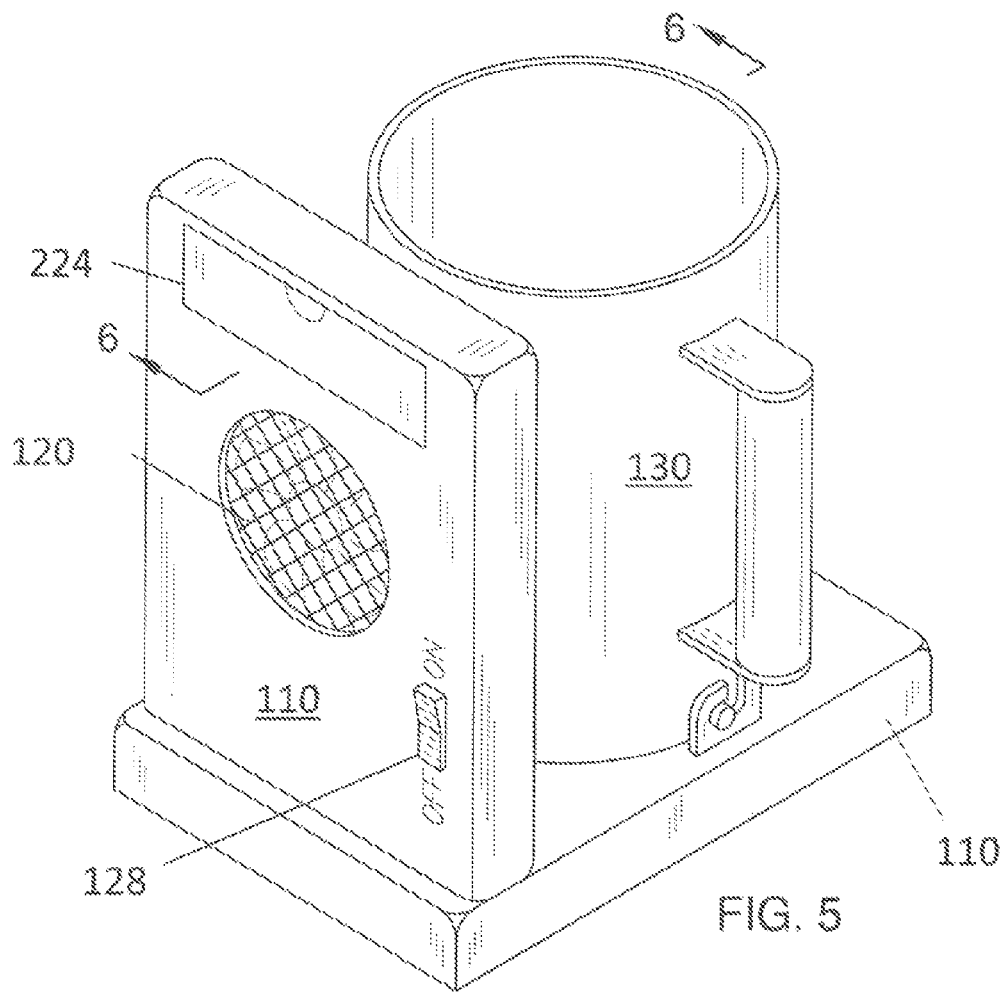
FIG. 5 is a perspective view of an alternative embodiment of the coal-preparing device of the present invention.
Figure 6:
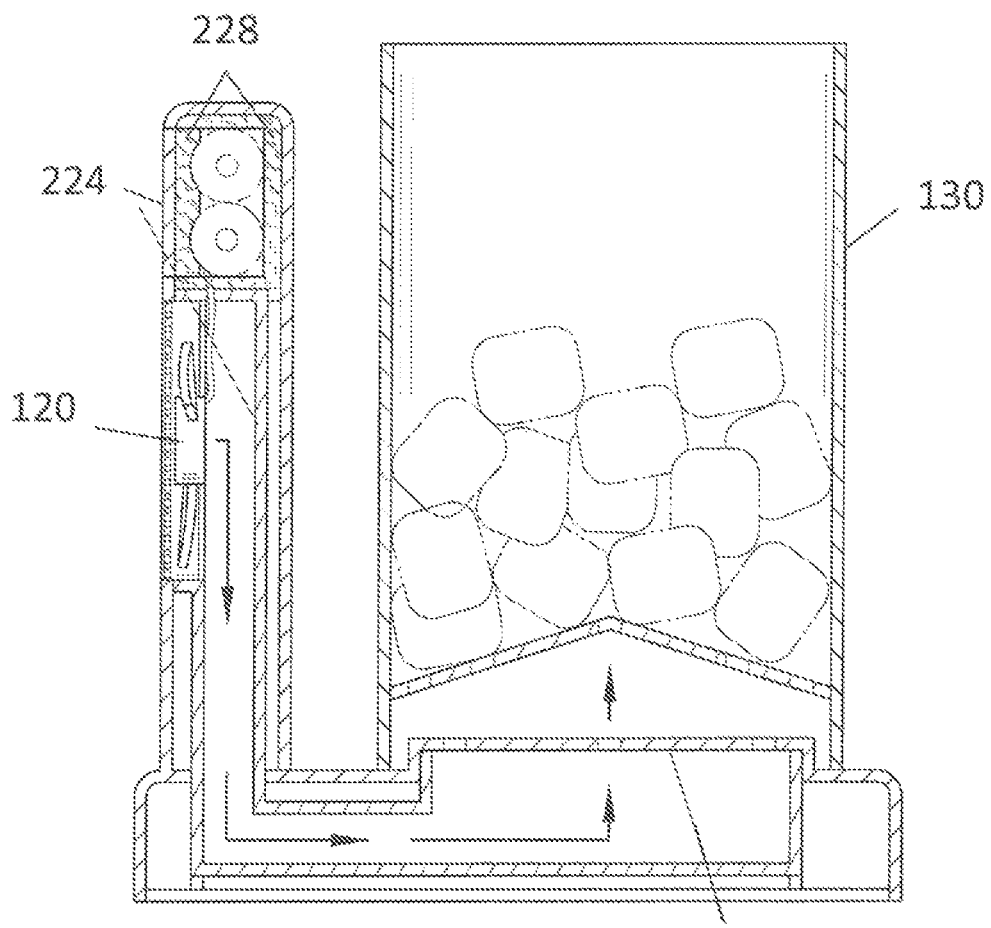

Referring now to FIG. 5 and FIG. 6, the base 110 may be constructed in an L-shape, the L-shape having a horizontal portion and a vertical portion. The top surface of the base 110 may refer to the top surface of the horizontal portion. In some embodiments, the top surface of the base 110 may also refer to the first side surface or the second side surface of the vertical portion. The fan component 120 may be disposed in the vertical portion. The fan component 120 draws air into the inner cavity of the base 110 via the first side surface of the vertical portion.

The following the disclosures of the following U.S. Patents are incorporated in their entirety by reference herein: U.S. Pat. No. 4,516,561; U.S. Pat. Application No. 2007/0044784; U.S. Pat. Application No. 2008/0230044; U.S. Pat. No. 7,301,765; U.S. Pat. No. 3,865,052; U.S. Pat. No. 6,894,896; U.S. Pat. No. 5,996,572; U.S. Pat. No. 6,707,668; U.S. Pat. Application No. 2007/0119444.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A coal-preparing device for charcoal briquettes, said device comprising:

(a) a base having a planar top surface and an inner cavity, wherein at a first position is a cylindrical platform having a planar upper surface offset from the top surface with a plurality of pores located in its upper surface, wherein the cylindrical, planar platform is fluidly connected to the inner cavity;

(b) a cylindrical canister having an inner cavity for holding charcoal briquettes, the canister can be temporarily secured to the base via a securing means comprising a locking pin disposed on the canister and a slot in the base in which the pin can be releaseably engaged, wherein a bottom surface of the canister is recessed into the canister a distance equal to or greater than the offset of the platform, wherein a plurality of air holes is disposed in the bottom surface of the canister, wherein the recessed bottom surface of the canister sets over and onto the offset platform on the base: and (c) a fan component disposed in the base, the fan component functions to draw air into the inner cavity in the base and through the pores and the air holes into the inner cavity of the canister, the fan component is operatively connected to a power source;

wherein the base is constructed in an L-shape, the L-shape having a horizontal portion and a vertical portion, wherein the fan component is disposed in the vertical portion and the canister is attachable to the horizontal portion.

2. The coal-preparing device of claim 1, wherein the bottom surface of the canister is generally slanted or curved.

3. The coal-preparing device of claim 1 further comprising a handle disposed on the canister.

4. The coal-preparing device of claim 1, wherein the fan component is disposed on the top surface of the base.

5. The coal-preparing device of claim 1, wherein the fan component is operatively connected to a control switch, the control switch can move between a first position to turn the fan component on and a second position to turn the fan component off.

6. The coal-preparing device of claim 1, wherein the power source is a battery.

7. The coal-preparing device of claim 1, wherein the fan component is covered via a grate disposed in the base.

8. The coal-preparing device of claim 1, wherein a battery compartment for holding a battery is disposed in the base.

9. The coal-preparing device of claim 1, wherein the slot is a locking hooks disposed on the base.

* * * * *